United States Patent [19]

Waszmer

[11] 4,067,121
[45] Jan. 10, 1978

[54] EDUCATIONAL GAME

[76] Inventor: Jacob Waszmer, 15 E. Bedell St., Freeport, N.Y. 11520

[21] Appl. No.: 711,387

[22] Filed: Aug. 3, 1976

[51] Int. Cl.² .............................................. G09B 7/00
[52] U.S. Cl. ...................................................... 35/9 D
[58] Field of Search ................... 35/35 R, 35 F, 31 A, 35/74, 9 R, 9 D

[56] References Cited

U.S. PATENT DOCUMENTS

| 317,365 | 5/1885 | Jacobs | 35/9 R UX |
| 1,656,030 | 1/1928 | Waring | 35/35 F X |
| 2,539,077 | 1/1951 | Hawkins | 35/90 X |
| 2,902,775 | 9/1959 | Arrowsmith et al. | 35/9 R |

*Primary Examiner*—William H. Grieb

[57] ABSTRACT

A game including a stand, a spinning wheel rotatable on the stand which has circumferentially spaced and different indicia thereon, a pointer which may be spun about the center of the wheel, and a set of cards. Each card has an indicium on one of its sides, and a word on the reverse side corresponding to the indicium. When a person spins the wheel and/or the pointer, and when the wheel and/or pointer has come to rest, and the pointer points to one of the indicia on the spinning wheel, the person spells the word represented by the indicium and checks the accuracy of spelling on the reverse side of the card showing the selected indicium.

3 Claims, 7 Drawing Figures

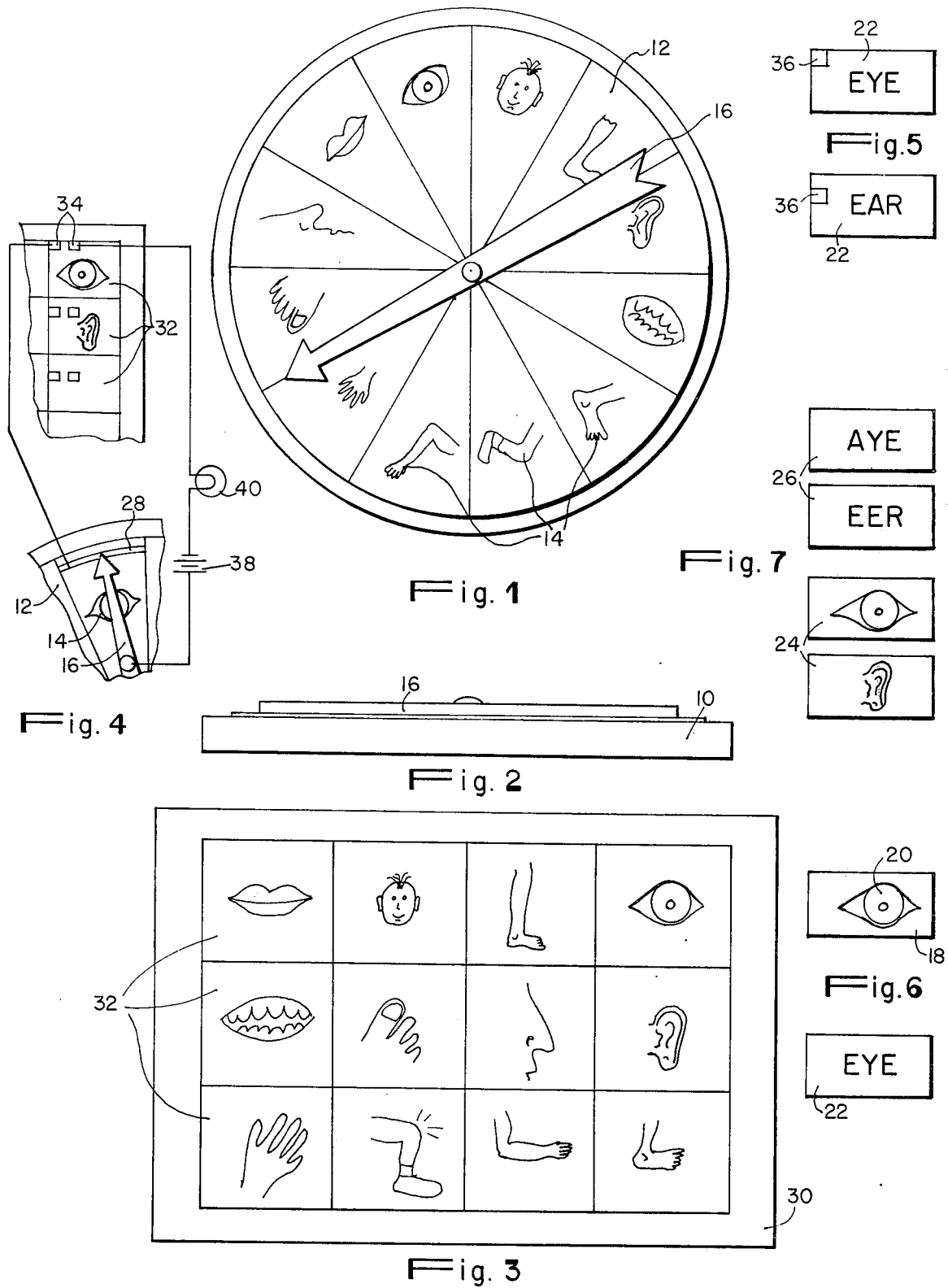

EDUCATIONAL GAME

BACKGROUND OF THE INVENTION

1. Field of the Invention

The present invention relates to an educational game.

2. Description of the Prior Art

A plurality of educational games are known; there is known for example, a game device for teaching reading and word pronunciation, a game based on categories on subject matter using playing tiles, a game made up or assembled by employing apparatus of other well known games, such as dominoes, a display holder and container for educational cards, an amusement and educational device, a television coordinated play kit, and a removable game board apparatus.

SUMMARY OF THE INVENTION

It is an object of my invention to provide an educational game primarily suitable for children, and adapted to teach children the correct spelling of simple words.

I accordingly provide a game including a stand, a spinning wheel having a center and rotatable on the stand, and wherein the spinning wheel has a plurality of circumferentially equispaced and different indicia thereon. A pointer may be spun on the wheel about the center thereof, and a plurality of cards is provided for use in conjunction with the game, wherein each of the cards has first and second sides, and the first sides have card-indicia thereon corresponding to the spinning wheel indicia, respectively, and wherein the second sides have words thereon corresponding to the card-indicia, respectively. When a person spins the wheel or pointer or both, and when the wheel and pointer have come to rest, and the pointer points to one of the indicia on the wheel, and upon the person subsequently selecting one of the card-indicia corresponding to the pointer-selected wheel indicium on the first card side, the spelling of the selected indicium may be verified on the second card side.

A second plurality of cards has third and fourth sides, respectively, and the third card sides have second card-indicia thereon which correspond to the first card-indicia. The fourth card sides have misspelled words thereon which correspond to the indicia, respectively. A person asked to pick the card which has the correct spelling on the pointer-selected indicium from the first and second plurality of cards scores a game point upon picking the correct spelling. The wheel has a plurality of conductive segments corresponding to the wheel indicia, respectively, and each of the segments is electrically contactable by the pointer. A board has a plurality of spaces which correspond to one of the plurality of cards, and each of the spaces correspond to the card-indicia, respectively. Each space has a pair of contacts placed thereon, respectively, and each of the contact placements differ from an other of the contact placements. Each of the first plurality of cards has a substantially invisible conductive strip on the first side thereof for bridging selected contact pairs, and the contact pair of the space which has one of the indicia disposed thereon is only bridgeable by one of the cards having one of the indicia on the first side thereof. The pointer, the pointer-selected contact pair, and electrical voltage source, and an electrically operable indicator may be placed in series by one of the strips placed in the corresponding one of the spaces. The electrical indicator is then actuated only upon the corresponding one of the strips bridging the contact pair of the space having the one of the indicia disposed thereon.

BRIEF DESCRIPTION OF THE DRAWING

My invention will be better understood with reference to the accompanying drawing in which:

FIG. 1 shows the spinning wheel and pointer of the educational game, according to my invention;

FIG. 2 shows an elevational view of the stand, the spinning wheel and the pointer of the game;

FIG. 3 shows the game board of the game;

FIG. 4 shows a schematic electrical circuit of a preferred embodiment of the game;

FIG. 5 shows two cards having respective strips mounted thereon;

FIG. 6 shows the front and reverse sides of a first set of cards; and

FIG. 7 shows the front and reverse sides of a second set of cards.

DETAILED DESCRIPTION OF THE PREFERRED EMBODIMENT

Referring now to the drawing, a game includes a stand 10, a spinning wheel 12 which has a center and is rotatable on the stand 10. The spinning wheel 12 has a plurality of circumferentially equispaced and different indicia 14 thereon. These indicia 14 will generally be members of a group, for example, parts of a body as shown, animals, food, household items, time, colors, shapes, letters, or the like. A pointer 16 may be spun on the wheel 12 about a center, and a plurality of cards 18 are used in conjunction with the game. Each of the cards 18 has a front or first, and a second or reverse side, and the first side has card-indicia 20 thereon which correspond to the spinning wheel indicia 14, respectively. The second card sides have words 22 thereon which correspond to the card-indicia 20, respectively. When a person spins either the wheel, or the pointer, or both, and when the wheel 12 and the pointer 16 have come to rest, and the resting pointer 16 points to one of the spinning wheel indicia 14, and when the person subsequently selects one of the card-indicia 20 corresponding to the pointer-selected wheel indicium 14 on the first card side, the spelling of the selected indicium 14 or 20 may be verified on the second card side. A second plurality of cards 24 has third and fourth sides, respectively, and the third card sides have second card-indicia thereon corresponding to the first card-indicia 20. Fourth card sides have misspelled words 26 thereon which correspond to the indicia, respectively. A person asked to pick the card which has the correct spelling of the pointer-selected indicium 20 from the first and second plurality of cards scores a game point upon picking the correct spelling.

In a preferred version of my invention, the wheel 12 has a plurality of conductive segments 28, which correspond to the wheel indicia 14, respectively. Each of the segments 28 may be electrically contacted by the pointer 16, and a board 30 has a plurality of spaces 32, which correspond to one of the pluralities of cards. Each of the spaces 32 correspond to the card indicia 20, respectively, and a pair of contacts 34 may be placed on each of the spaces. Each of the contact placements differ from an other of the contact placements, and each of the first plurality of cards 18 has a substantially invisible conductive strip 36 on the first side thereof for bridging selected contact pairs 34. The contact pairs 34 of the space 32 which has one of the indicia disposed thereon is only bridgeable by one of the cards which has the one of the indicia on the first side thereof. The pointer 16, the pointer-selected contact pair 34, an electrical voltage source 38, such as a battery, and an electrically operable indicator 40, such as a light, may be placed in series by one of the strips 36 placed on the corresponding one of the spaces 32. The electrical indicator 40 is then actuated only upon the corresponding one of the strips 36 bridging the contact pair 34 of the space which has the one of the indicia disposed thereon.

Although the invention has been described with respect to a preferred version thereof, it is to be understood that it is not to be so limited since changes can be made therein which are within the full intended scope of the appended claims.

I claim:

1. A game comprising:
   a stand;
   a wheel having a center mounted on said stand, said wheel having a plurality of circumferentially equispaced and different indicia thereon;
   a pointer spinnable relative to said wheel about said center;
   a plurality of cards, each of said cards having first and second sides, said first sides having card-indicia thereon corresponding to the wheel indicia, respectively, said second sides having words thereon corresponding to said card-indicia, respectively, said wheel including a plurality of conductive segments corresponding to the wheel indicia, respectively, each of said segments being electrically contactable by said pointer, and means defining a plurality of spaces corresponding to one of said pluralities of cards, each of said spaces corresponding to said card indicia, respectively, and including a pair of contacts placed thereon, respectively, each of the contact placements differing from another of the contact placements, each of said first plurality of cards including a conductive strip thereon substantially invisible from the first side thereof for bridging selected contact pairs, the contact pair of the space having one of said indicia disposed thereon being only bridgeable by one of said cards having said one of said indicia on the first side thereof, said pointer, the pointer-selected contact pair, an electrical voltage source and an electrically operable indicator being placeable in closed circuit when one of said cards is placed in a corresponding one of said spaces so that the electrical indicator is actuated only when the card with said corresponding one of said strips bridges the contact pair in the space having said one of said indicia disposed thereon, whereby when a person relatively spins the wheel and pointer, and the pointer comes to rest pointing to one of said indicia, and the person subsequently selects one of said card-indicia corresponding to the pointer-selected wheel indicium on the first card side and places the card in the corresponding space, the spelling of the selected indicium on the second card side is verifiable by actuation of the indicator.

2. A game according to claim 1 further comprising a second plurality of cards having third and fourth sides, respectively, the third card sides having second card-indicia thereon corresponding to the first card-indicia, the fourth card sides having misspelled words thereon corresponding to said indicia, respectively, whereby a person asked to pick the card having the correct spelling of the pointer-selected indicium from said first and second plurality of cards scores a game point upon picking said correct spelling.

3. A game according to claim 1 wherein said means defining the plurality of spaces comprises a board.

* * * * *